Dec. 8, 1959

C. A. ELSEY 2,916,253

PLUG VALVE

Filed Sept. 17, 1953

Inventor:
Cleo A. Elsey
By Wilmer Mechlin
his Attorney

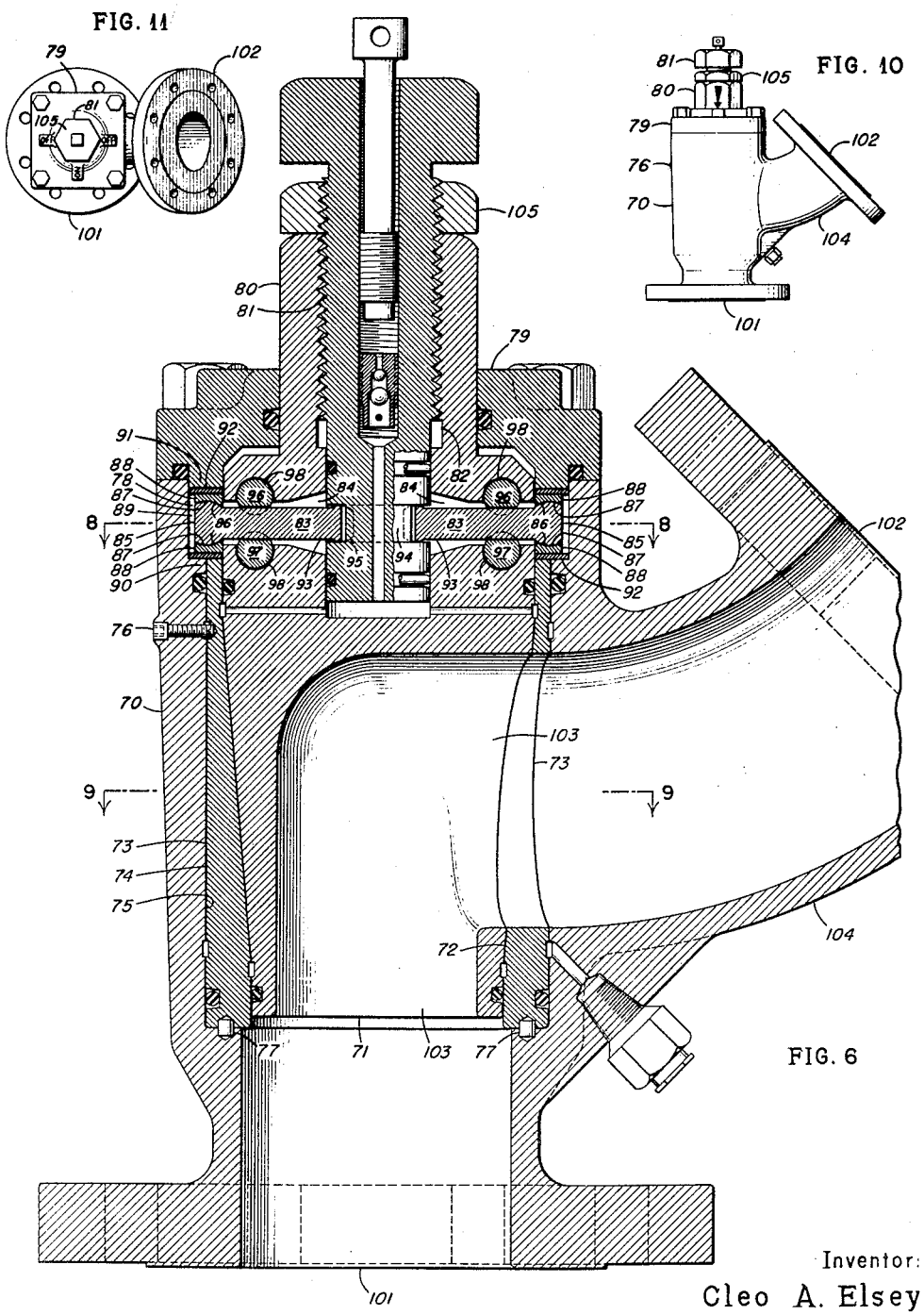

Dec. 8, 1959 C. A. ELSEY 2,916,253
PLUG VALVE
Filed Sept. 17, 1953 4 Sheets-Sheet 3
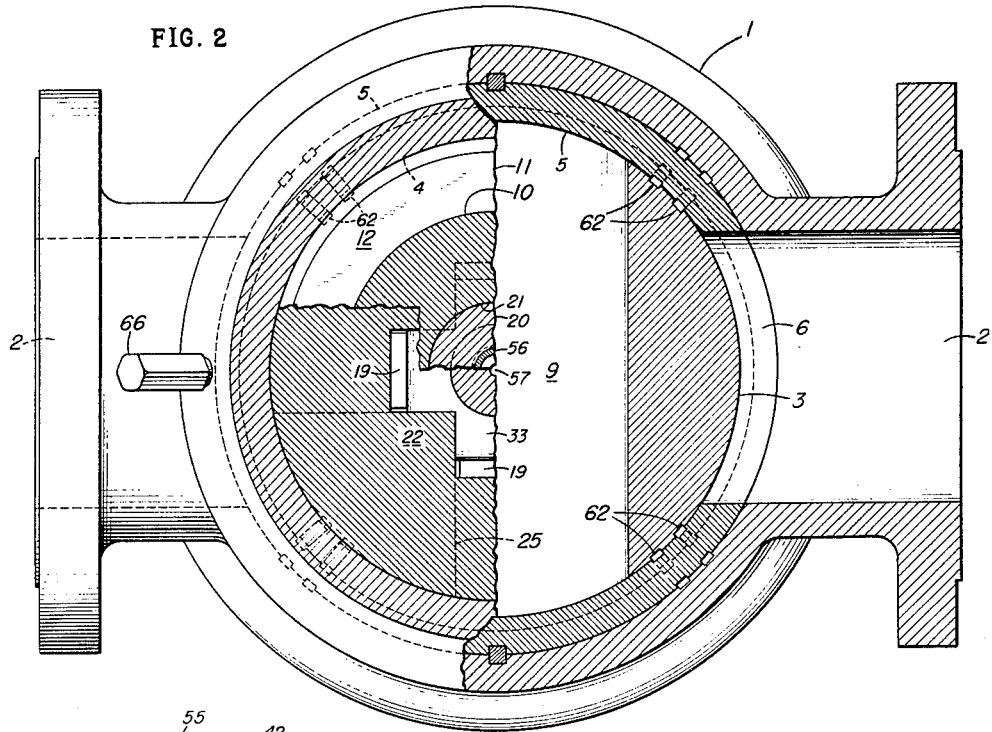
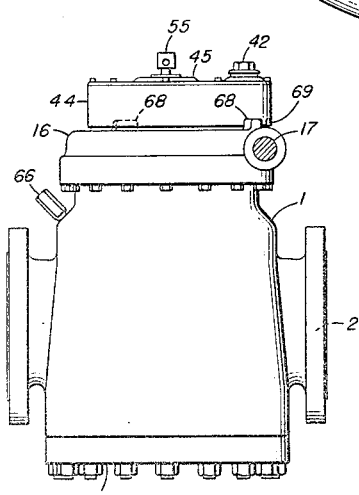
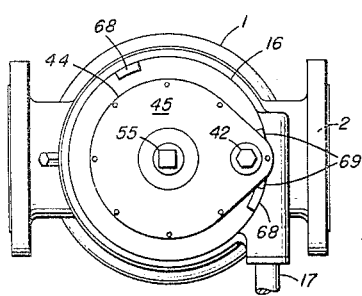
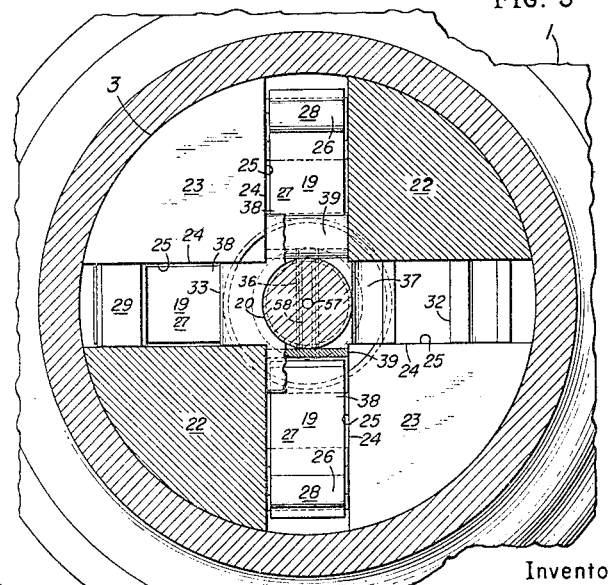
Inventor:
Cleo A. Elsey
By Wilmer Mechlin
his Attorney Dec. 8, 1959 C. A. ELSEY 2,916,253
PLUG VALVE
Filed Sept. 17, 1953 4 Sheets-Sheet 4

Inventor:
Cleo A. Elsey
By Wilmer Mechlin
his Attorney

United States Patent Office 2,916,253
Patented Dec. 8, 1959

2,916,253
PLUG VALVE

Cleo A. Elsey, Bartlesville, Okla.

Application September 17, 1953, Serial No. 380,704

14 Claims. (Cl. 251—161)

This invention relates to plug valves and has for its primary object the provision of an improved plug valve of the type containing means for forcing a stuck plug from its seat.

In its many applications as a cut-off valve, the plug valve stands idle for long periods. Due to the intermittent operation of the valve, its plug tends to stick in its seat and often becomes so stuck as to render the valve inoperative. In such case the plug must be loosened by some means and sometimes can be jarred loose by hammer blows. However, jarring may damage the valve and is ineffective for reseating the plug, especially where the pressure in the line requires the valve to be forced into its seat in order to be fluid-tight.

It is therefore another object of the invention to provide a plug valve having force-applying means for both unseating and seating the plug whereby the valve is rendered both fluid-tight and non-sticking.

A further object of the invention is to provide a plug valve wherein the plug is positively unseated and held and guided in spaced relation to its seat during rotation to open or closed position, whereby scoring of the plug and seat is prevented and the valve is given an extended life.

An additional object of the invention is to provide a plug valve wherein screw jack-actuated lever means are employed for moving the plug axially of its seat, enabling optimum force to be applied for unseating the plug and ensuring operability of the valve even under severe service conditions.

Another object of the invention is to provide a plug valve in which the same screw-actuated lever means serve to force the plug both out of and into its seat.

Another object of the invention is to provide a plug valve using built-in lever means for unseating the plug and having a novel pressure grease system which may also be employed to assist and thus facilitate the action of the lever means in unseating the plug.

A further object of the invention is to provide a plug valve in a circumferential seal which is maintained about the plug, whether the plug is seated or has been unseated by the associated plug-loosening means, whereby the plug valve may be adapted for use as either a straight line or an angle valve.

Yet another object of the invention is to provide a plug valve incorporating force means for seating and unseating the valve, wherein the several moving parts are spaced from the casing, the plug by a removable sleeve, whereby the parts subjected to wear in operation of the valve may be replaced readily and the life of the casing is determined only by its resistance to the surrounding medium and the fluid passing through the valve.

Other objects and advantages of the invention will appear hereinafter in the detailed description, be particularly pointed out in the appended claims, and be illustrated in the accompanying drawings, in which:

Figure 2 is a horizontal sectional view taken along the lines 2—2 of Figure 1.

Figure 3 is a fragmentary horizontal section view taken along the lines 3—3 of Figure 1.

Figure 4 is a side elevational view on a reduced scale of the valve of Figure 1.

Figure 5 is a plan view of the valve on the scale of Figure 4.

Figure 6 is a vertical cross-section of a second embodiment of the plug valve.

Figure 10 is a side elevational view on a reduced scale of the valve of Figure 6; and Figure 11 is a plan view of the same valve on the scale of Figure 10.

Figure 1:
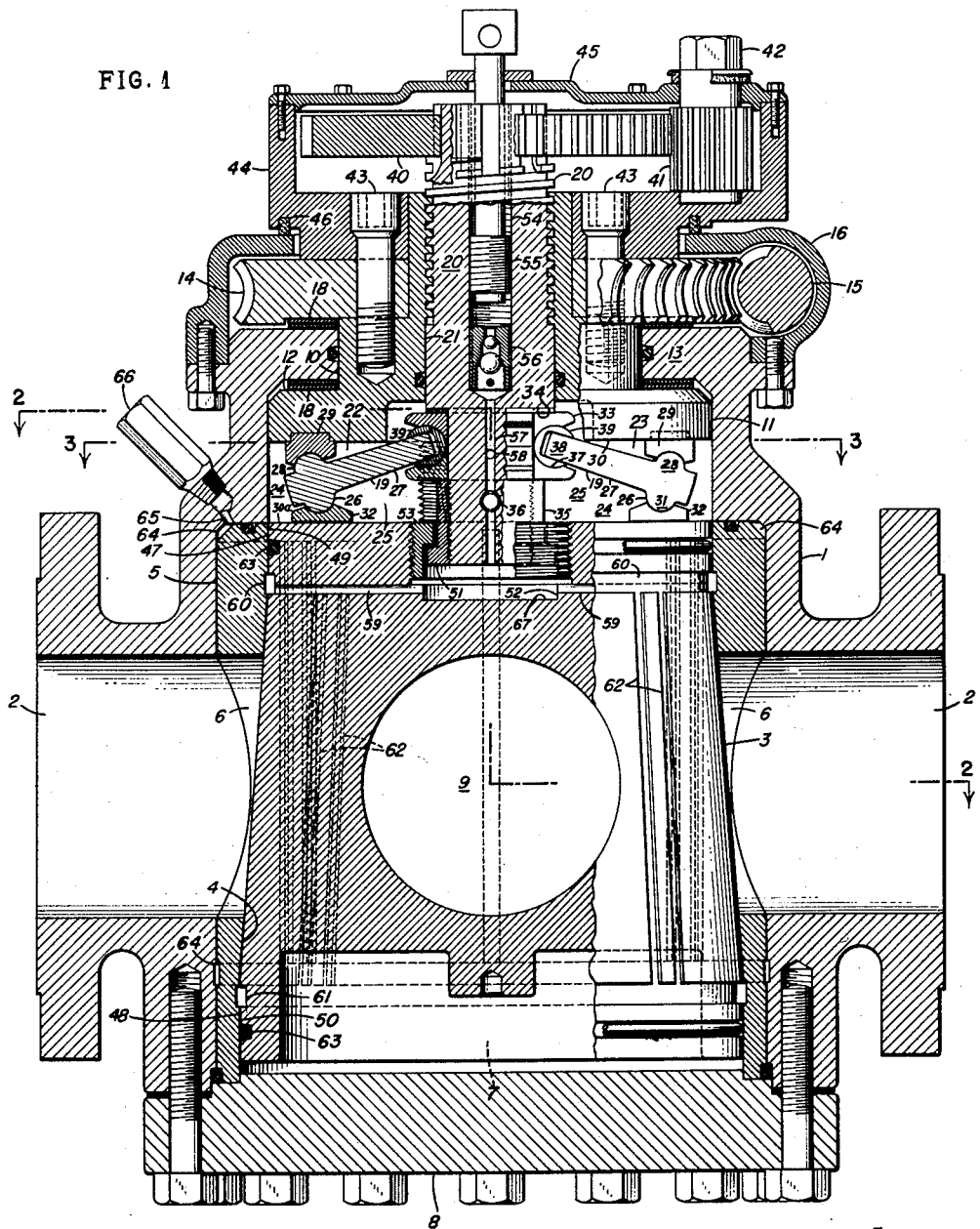
Figure 1 is a vertical cross-section of one embodiment of the plug valve of the present invention.
Figure 7:
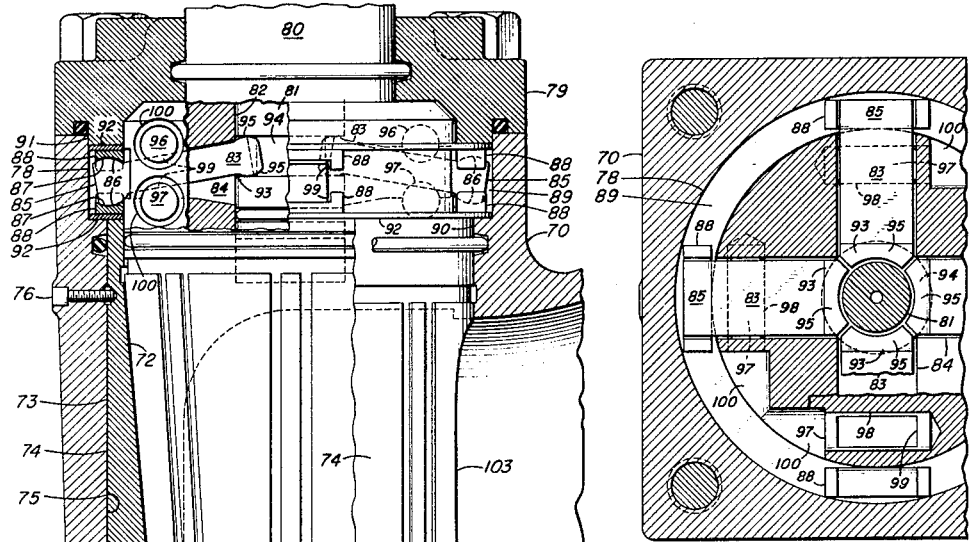
Figure 7 is a fragmentary view taken in part on the section of Figure 6 with the plug shown in unseated position.
Figure 8:
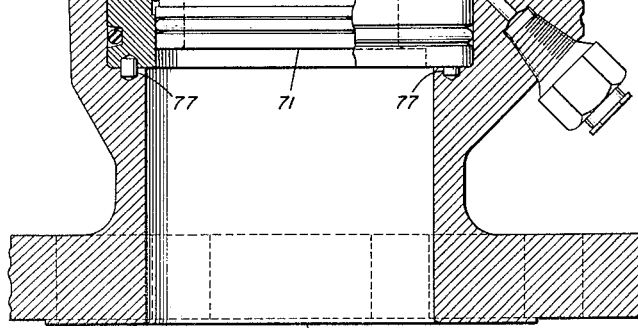
Figure 8 is a fragmentary horizontal sectional view taken along the lines 8—8 of Figure 6.
Figure 9:
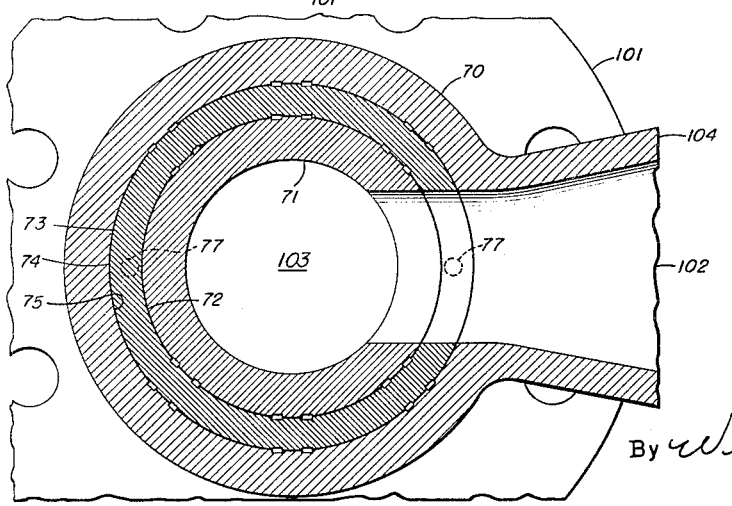
Figure 9 is a fragmentary horizontal sectional view taken along the lines 9—9 of Figure 6.

Referring now in detail to the drawings, in which like reference characters designate like parts, two main forms of the plug valve of the present invention have been selected to illustrate its versatility. One is designed particularly as a high pressure valve and the other as a low pressure with the latter showing a modification of casing and plug by which either valve may be adapted for use as an angle valve. But, whether termed a high or a low pressure valve, both valves possess in common, though varied in form, several of the features of this invention, including lever means for forcing a stuck plug from its seat and lever or other force means for reseating the plug.

Turning first to the embodiment of Figures 1 through 5, the plug valve there shown in comprised of a casing or body 1 having a pair of aligned ports 2, between which is inserted a tapered or frusto-conical plug 3. The plug 3 seats in a valve seat 4 in the casing 1, the seat being formed either integrally with the casing or, as here, in a removable sleeve 5 keyed against rotation to the casing and having openings 6 aligning with the ports 2. Both the plug 3 and the seat 4 are designed to be inserted and removed through an opening 7 in the bottom of the casing 1, the opening normally being closed by a gasket-sealed cover 8 bolted to the casing.

For passage of fluid through the valve, the plug 3 is apertured transversely to provide a transverse passage or bore 9 which, when the valve is open, aligns with the ports 2 and sleeve openings 6, and, in the closed position of the valve, is normal or at an angle of 90° thereto.

For rotating the plug 3 between open and closed positions there is provided a valve actuating stem 10 which surmounts but is separate from the plug. This stem extends into and is housed, in part, in the casing 1.

The actuating stem in this embodiment is tiered, having a lower or skirt portion 11 seating within the casing, with an upper horizontally directed face 12 abutting against an inturned or inwardly directed annular flange 13 formed integrally with the casing, the stem above its lower portion being necked to pass through the flange 13.

The actuating stem may, in turn, be actuated by a wrench, but for maximum leverage is here actuated by a worm gear, the worm wheel 14 of which is bolted to the actuating stem above the flange 13 on the casing 1 and its worm 15 being housed in a cover 16, also housing the worm wheel and bolted to the casing, the worm having an operating shaft 17 extending from the cover 16. The illustrated worm gear, in addition to its great leverage, is, of course, substantially self-locking, of advantage in ensuring setting of the plug. Designed to be rotated relative to the casing by the worm gear, the actuating stem, as well as the associated worm gear, is preferably spaced from the confronting faces of the inturned flange 13 of the casing by bearing rings 18 of the self-lubricating type.

Despite the leverage afforded by the worm gear, rotation or turning of the plug 3 will often be impossible, or at least difficult, without damage to the parts, and therefore impractical, due to freezing of the plug in its seat. Consequently, it is necessary to provide means by which the plug can be loosened in its seat or unseated prior to rotation, so that the valve is free to operate.

In the valves of this invention the plug is adapted to be freed by camming levers actuated by a screw-jack, the levers being enclosed in the valve casing for protection from the elements and, with their screw-jack actuation, applying maximum force for displacing or shifting the plug axially relative to its seat. In this embodiment of the invention a plurality of camming or bell-crank levers 19, here four in number, are interposed between the valve-actuating stem 10 and the plug 3 and are adapted to be actuated by a screw-jack or lever-actuating stem 20, the latter extending through and threadedly engaging a central axial bore 21 in the valve actuating stem and coaxial or concentric with both the stem and the plug 3.

For accommodating the camming levers 19, as well as for applying force through the levers to rotate the plug 3 after it has been unseated, the confronting ends of the stem and plug are overlapped and provided with interfitting or overlapping, axially extending, sector-shaped teeth or fingers, those 22 of the stem being diametrically opposed and alternating in interfitting relation with the correspondingly opposed teeth 23 of the plug.

As shown in Figure 3, the teeth 22 and 23 are flat-sided and circumferentially spaced, when assembled, so as to provide therebetween a plurality of radially arranged circumferentially spaced slots, guideways or slideways 24, each defined laterally by the vertical faces or sides 25 of adjacent teeth. These slots 24 extend through the stem of the plug to the inner wall of the casing 1, are preferably substantially rectangular in cross-section, and each is adapted to slidably receive or accommodate one of the camming levers 19. The camming levers also are preferably rectangular in section and are of a width to fit neatly in the slots, the side clearances, while sufficient to permit free movement of the levers, being held at a minimum to practically eliminate lost motion in take-up between the teeth and levers on rotation of the plug by the valve-actuating stem. Each camming lever may be T-shaped in elevation with a cam or camming portion 26 at or adjacent its outer extremity and a lever arm or lever 27 forming its shank. The cam may be in the form of the illustrated transversely or vertically spaced semi-cylindrical heads or protuberances, one or the upper 28 pivotally seating in a fulcrum block 29 fixed radially to the underface 30 of the stem, and the other or lower head 31 pivoting in a pillow block 32 bearing against and slidably engaging the upper face 30a of the plug.

For connecting the levers to the screw-jack 20 there may be provided a collar 33 rotatably encircling or collaring a restricted lower portion of the screw-jack and held in place against a shoulder 34 by a capped or skirted nut 35, the latter being lockable to the stem by suitable means such as the illustrated split tube 36. Formed in the collar 33 and each facing and disposed transversely of one of the slots 24, are a plurality of sockets or pockets 37 each adapted to receive the tail 38 of one of the levers 19. The levers may directly engage the collar. However, for maximum freedom of movement, it is preferred that they slidably seat or fit in and directly engage cylindrical thimbles 39 rotatably mounted in the sockets 37, the latter for this purpose being of corresponding configuration and the collar being split axially for seating of the thimbles.

With the tails 38 of the levers seated in the thimbles 39 and the collar 33 rotatable relative to the screw-jack 20, turning of the screw-jack inwardly with respect to the valve-actuating stem 10 will force the tails of the levers downwardly, causing their cams 26 to fulcrum about the fulcrum blocks 29 and, through the pillow blocks 32, apply pressure against the upper ends of the plug 3 to force or displace the plug from its seat 4. Inclined downwardly from the collar 33 in retracted or normal position, the longitudinal axes of the levers 19 will be of progressively less inclination as the screw-jack 20 is turned downwardly until, at maximum vertical spacing between the semicylindrical heads 28 and 31, the levers will be substantially horizontal. This variance in inclination or angularity of the levers, as the plug 3 is displaced, is accommodated by flaring the mouths of the sockets 37 and correspondingly beveling the fulcrum block 29 and pillow block 32.

Like the valve-actuating stem 10, the screw-jack 20 may be operated directly by a wrench, but for greater leverage is operated by spur gears, the larger 40 of which is keyed to the screw-jack, and the smaller 41 of which has a hex or similar head 42 for lever operation. For protection of the parts, it is preferred that the spur gears be housed and to this end there is mounted on the valve-actuating stem 10 above the worm wheel 14 and bolted thereto by the bolts 43 by which the worm wheel is attached an upper housing 44 enclosing the spur gears and closed at its upper end by a cap or cover 45, the upper housing having wiping contact with the housing 16 of the worm gear, since rotatable relative thereto, through an annular gasket 46.

As shown in Figure 1, the surfaces of the upper and lower extremities 47 and 48 of the plug 3 contiguous to the conical intermediate portion of the plug are not conical, but cylindrical, and the confronting portions 49 and 50 forming the wall of the sleeve 5 above and below the valve seat 4 are of corresponding configuration, these cylindrical surfaces maintaining contact and guiding the plug throughout the range of its axial or vertical movement. It will be noted, also, that the cylindrical surfaces 47 and 48 are substantially equal in diameter to the contiguous sections of the tapered intermediate portion of the plug, this in the case of the lower 48 of the cylindrical surfaces permitting the adjoining end of the tapered portion to be withdrawn into the cylindrical end portion of the wall of the sleeve without interfering with guidance of the plug. More importantly, the provision of guiding surfaces on the side of the plug enable the passage 9, through the plug, to extend axially or transversely, or both, without interfering with the guidance of the plug. If unsupported, the plug, when unseated, would tend to drop against the bottom cover 8. Instead, it is then suspended from and supported by the screw-jack 20 through the skirted nut 35 on the lower end of the latter, the nut for this purpose having its skirt 51 seated in a cylindrical recess 52 in the upper portion of the plug and being held therein by a shouldered insert 53 screwed into the plug. The supporting means so provided also serves to reseat the plug after its rotation. The levers 19 being inoperative to raise the plug, the force for this purpose is supplied by the screw-jack 20, counterclockwise rotation of which pulls the plug into its seat through the shouldered engagement between the skirted nut 35 and the shouldered insert 53.

In the preferred form of this embodiment the screw-jack 20, like the valve-actuating stem 10, is hollow, to permit oil to be applied under pressure to aid in unseating the plug, but mainly to provide pressure lubrication of the surfaces of the relatively rotatable members. The screw-jack is open at the top and its axial bore 54 is threaded to receive a pressure-applying plunger or screw 55, the bore below the screw having a one-way ball valve 56 and from thence to its lower end, a restricted axial channel or conduit 57 opening into the recess 52 in the plug in which seats the skirted nut 35. Radiating from the channel 57 in line with the collar 33 is a conduit 58 by which the inner surface of the collar is lubricated and, within the plug, like access to the conical face of the plug is obtained by radially disposed conduits 59. The latter conduits terminate outwardly in an annular groove 60 encircling the plug above the valve seat. This groove is connected to a corresponding annular groove 61 extending circumferentially of the plug adjacent its lower extremity by channels 62 formed in and extending longitudinally or axially of the outer face of the plug. Above and below the annular grooves 60 and 61 the plug is sealed to the sleeve 5 by O or sealing rings 63, like rings also being provided, as necessary, throughout the valve to render the valve fluid-tight.

To facilitate insertion and removal and sealing of the sleeve 5 when the valve seat becomes worn, it is preferred that lubricant be applicable between the latter and the casing, proper. For this purpose annular recesses 64 may be provided between the casing and the sleeve, each suppliable with oil under pressure through suitable means such as the port 65 which is normally closed by the threaded cap 66.

With the described oiling arrangement, lubricant introduced into the bore or chamber 54 is driven by the plunger 55 through the several conduits to the mating faces of the relatively rotatable members, the split tube 36, locking the skirted nut 35 to the screw-jack 20, being pierced to permit passage of the lubricant therethrough. When used in conjunction with the levers 19 for unseating the valve, the lubricant will react against the plug through the lower face 67 of its cylindrical recess 52.

It has been mentioned that the lateral spacing between the levers 19 and the slots 24 is held at a minimum consistent with free movement of the levers to minimize play on rotation of the valve by the valve-actuating stem 10. Once unseated in the manner described, the plug 3, then suspended on the screw-jack 20 through the skirted nut 35 of the latter, is free to be rotated in either direction by the associated worm gear comprised of the worm wheel 14 and worm 15. Due to the slight lateral clearance between the levers and their slots, the plug will begin to turn almost immediately on turning of the worm 15 and will continue to turn throughout its 90° range of movement between open and closed positions. To ensure that the plug will be full open or full closed, depending on the position desired, stop lugs 68 may be formed integrally with the intermediate housing 16 for engagement with a corresponding positioning lug 69 formed on the upper housing 44, to fix the extremities of rotative movement of the plug at these two positions. Suitable indicia, not shown, may be formed or stamped in the upper cover 45 for visual indication of the condition of the valve in these two positions.

The modified form of plug valve shown in Figures 6–11 illustrates the adaptation of the valve of the present invention, having as its main features screw-jack actuated levers for unseating the plug and suspension and guidance of the plug during rotation, both to an angle type plug valve and to a valve in which the plug is inserted through the top of the casing.

In the form shown, the plug valve of this embodiment is comprised of a casing 70 having a downwardly tapered or frusto-conical plug 71 seated in a valve seat 72, the latter for prolonged life being formed in a separable or removable sleeve 73. The sleeve 73 for ready insertion and removal preferably has a cylindrical outer wall 74 seated in a correspondingly configured seat 75 in the casing 70, and held against rotation relative thereto by suitable means, such as the illustrated transverse set screw 76 and longitudinal pins 77.

Both the sleeve 73 and the plug 71 are insertible or assemblable through an opening 78 in the top of the casing, the opening normally being closed by a bonnet or cover 79 bolted to the casing. The bonnet is axially bored to receive the actuating stem 80 of the plug, the stem above the bonnet being hex- or like sided for operation by a wrench or like means (not shown). Surmounting the plug, the stem is integral therewith, the two parts being cast or otherwise formed as one.

For unseating the plug 71 there is here employed, as an actuating member, a screw-jack 81 extending into and threadedly engaging an axial bore 82 in the valve-actuating stem 80. The screw-jack 81 does not act directly on the plug, but applies its force through a plurality of levers 83, here four in number. As shown, the levers 83 extend radially from the screw-jack 81 and each is accommodated or received in one of a plurality of radially arranged, circumferentially spaced, slots or guideways 84, formed in and projecting through the valve-actuating stem 80 intermediate its ends. The levers are substantially rectangular in cross-section, with their slots 84 of corresponding configuration, though of greater depth, the slots being flared inwardly adjacent the screw-jack 81 to provide for angling of the levers.

The levers 83 here are designed to apply force, not only for unseating the plug, but for reseating the plug after rotation. To this end, the levers are fulcrumed at their outer ends or heads 85 on the casing, the ends having concentric cylindrical upper and lower faces 86, each seated in a correspondingly cylindrical socket 87 in and intermediate the ends of a saddle or fulcrum block 88. The fulcrum blocks, disposed transversely of the levers and pivotally engageable thereby through their cylindrical sockets 87, may conveniently slide or ride in an annular raceway 89 formed by recessing the upper part of the casing 70 and bounded axially by a lip or shoulder 90 in the casing and a confronting annular abutment 91 on the bonnet 79. To facilitate rotation, the fulcrum blocks 88 may be spaced axially from the casing 70 and bonnet 79 by bearing rings or races 92, preferably of the self-lubricating type.

The inner ends or tails 93 of the levers seat in and engage the screw-jack 81 through an annular groove 94 formed in the screw-jack. Although the connection between the levers and the screw-jack may be similar to that of the first embodiment, for simplicity, the levers directly engage the screw-jack, their tails 93 being recessed axially of the screw-jack for maximum bearing and having convexly arcuate or cylindrical upper and lower faces 95 for unrestricted angling in the groove 94. Slipping of the tails of the levers from the groove is here prevented by the edge contact between the saddles 87 and the raceway 88, surface contact being obtainable, if preferred, by cylindrically surfacing the vertical face of the saddles to correspond to that of the raceway.

Each of the levers acts intermediate its ends on the stem 80 through rockers or rocker-bearings, one, 96, above and the other, 97, below the lever, the rockers being cylindrical and rotatable relative to the stem 80 through corresponding seats 98 formed in the stem and, to receive and turn with the levers, having rectangular recesses 99 in which the levers seat. Ready access to the seats 98 for insertion of the rockers 96 and 97 may be had through enlarged drillings 100 aligned with the seats and open to the exterior of the stem 80. With this construction, it is evident that as the screw-jack is turned up, the levers, fulcruming in the raceway 89, will act through the upper 96 of the rockers to pull or force the plug out of its seat to the position shown in Figure 7, and on reverse movement of the stem, will act through the lower 97 of the rockers to forcibly reseat the plug, the plug when unseated, being suspended from the casing through the levers and the screw-jack.

Centering and guidance of the plug 71 during its axial and rotative movements may be obtained in the same manner as in the first embodiment by cylindrically surfacing the plug above and below the valve seat 72 and correspondingly surfacing the sleeve 73. Forced lubrication of the engaging tapered surfaces of the plug and sleeve, as well as the surfaces of the sleeve and casing, is preferred and may be obtained by a lubricating system like that of the first embodiment.

The suspension and guidance of the plug during movement, obtainable with either of the illustrated forms of the invention, enables either the plug valve to be made as either a straight-line or an angle type valve. This versatility of the valves is illustrated in the second embodiment in which the casing 70 and plug 71 have been modified to provide an angle type plug valve.

In the modification the casing 70 is extended below the plug 71 to provide a flanged port 101 aligned axially with the plug and connectable therethrough to a flanged port 102 formed in the side of the casing and disposed at an angle to the first or lower port 101, the included angle between the ports being selected for the application desired and here being shown as 135°. Since the corresponding access openings 103 in the plug may most conveniently be normal or at right-angles to each other, a different angular disposition of the ports in the casing will require an elbow 104, which may be formed as an integral part of the casing, for directing fluid between the plug and the second or upper port 102.

Once the plug is unseated, a quarter turn or rotation through 90° will open or close the valve, depending on its initial condition, both the initial condition and the direction of rotation necessary being readily ascertainable by suitable indicia stamped, etched or otherwise formed in the projecting portion of the stem 80 and the bonnet 79. To prevent accidental displacement of the plug, it is desirable that the screw-jack 81 be lockable against rotation when not in use. This may readily be obtained by the interposition of a lock-nut 105 between the heads of the screw-jack and stem.

From the above detailed description, it will be apparent that there has been provided an improved plug valve embodying a screw-jack for seating and unseating the plug and having means for positively holding the plug free of its seat during rotation. Although both of the disclosed embodiments of the valve are pressure-lubricated, it will be evident that the positive clearance obtained during rotation adapts the valve equally for use as a dry-seal valve with a membrane-coated plug. It should be understood that the described and disclosed embodiments are merely exemplary of the invention and that all modifications are intended to be included which do not depart either from the spirit of the invention or the scope of the appended claims.

Having described my invention, I claim:

1. A plug valve comprising a casing having spaced ports, a tapered plug seated in said casing between and having a passage therethrough for connecting said ports, means for rotating said plug, a screw-jack coaxial with and rotatable relative to said rotating means, and lever means actuated by said screw-jack and acting on said plug for unseating said plug prior to rotation thereof.

2. A plug valve comprising a casing having spaced ports, a plug seated within said casing between and having a passage therethrough for connecting said ports, lever means within said casing for unseating said plug, a screw-jack associated with said casing for actuating said lever means, and means in and projecting from said casing for rotating said plug, said last named means being threadedly engaged by said screw-jack and on actuation rotating said lever means and therethrough said plug.

3. A plug valve comprising a casing having spaced ports, a valve seat in said casing between said ports, a plug within said casing and having a tapered portion seatable in said seat and a passage through said portion for connecting said ports, means for rotating said plug, a screw-jack threadedly engaging said rotating means, lever means actuated by said screw-jack and transmitting force therefrom for axially unseating said plug, and cylindrical surfaces on said plug above and below said tapered portion and engaging corresponding surfaces in said casing for guiding said plug during axial and rotative movements thereof.

4. A plug valve comprising a casing having spaced ports and a valve seat between said ports, a plug within said casing normally seated in said seat and having a passage therethrough for connecting said ports, plug-rotating means in said casing, screw-jack means coaxial with said rotating means, and lever means interposed between said rotating means and plug and actuated by said screw-jack means for displacing said plug axially of said seat.

5. A plug valve comprising a casing having spaced ports and a valve seat between said ports, a plug within said casing normally seated in said seat, said plug having a passage therethrough for connecting said ports, plug-rotating means in said casing, screw-jack means associated with said rotating means, and lever means sealed within and fulcrumed on said casing and interposed between said rotating means and plug, said lever means being actuated by said screw-jack means for displacing said plug axially of said seat.

6. A plug valve comprising a casing having spaced ports and a valve seat between said ports, a plug within said casing and normally seated in said seat, said plug having a passage therethrough for connecting said ports, plug-rotating means in said casing, screw-jack means associated with said rotating means, and lever means sealed within and fulcrumed on said casing and interposed between said rotating means and plug, said lever means being actuated by said screw-jack for shifting said plug axially in either direction relative to said seat.

7. A plug valve comprising a casing having spaced ports and a valve seat between said ports, a plug within said casing and normally seated in said seat, said plug having a passage therethrough for connecting said ports, plug-rotating means in said casing, screw-jack means associated with said rotating means, and camming levers within said casing and acting between said rotating means and plug and actuated by said screw-jack means for unseating said plug from said seat.

8. A plug valve comprising a casing having spaced ports and a valve seat between said ports, a plug within said casing and normally seated in said seat, said plug having a passage therethrough for connecting said ports, plug-rotating means in said casing, screw-jack means coaxial with said rotating means, camming levers actuated by said screw-jack means for unseating said plug, and means carried by said screw-jack means and engageable with means on said plug for reseating said plug.

9. A plug valve comprising a casing, a valve seat in said casing, a plug in said casing and normally seated in said seat, a plurality of angularly disposed ports in said casing and spaced by said seat, at least one of said ports being concentric with said seat, said plug having a passage therethrough alignable with said ports and being rotatable relative to said seat for alternately connecting and disconnecting said ports, screw-jack means coaxial with said plug, and lever means actuated by said screw-jack means for axially displacing said plug relative to said seat.

10. A plug valve comprising a casing having spaced angularly disposed ports, a valve seat between said ports, a plug in said casing and normally seated in said seat, said plug having a passage therethrough alignable with said ports and being rotatable relative to said seat for alternately connecting and disconnecting said ports, screw-jack means associated with said plug, lever means sealed within and fulcrumed on said casing and actuated by said screw-jack means for axially displacing said plug relative to said seat, and a cylindrical surface on said plug and encircling an end of said passage, said cylindrical surface engaging a corresponding surface in said casing for guiding said plug during axial displacement thereof.

11. A plug valve comprising a casing having spaced ports, a removable one-piece sleeve in said casing between and having openings aligned with said ports, a valve seat in said sleeve, a plug within and removable axially from said sleeve and normally seated in said seat, said plug having a passage therethrough for connecting said ports and being rotatable relative to said seat for alternately opening and closing said valve, a screw-jack mounted on said casing, and lever means sealed within and reacting against said casing, said lever means being actuated by said screw-jack means and acting on said plug for moving said plug axially of said seat.

12. A plug valve comprising a casing having spaced ports, a valve seat in said casing between said ports, a plug in said casing and normally seated in said seat, said plug having a passage therethrough for connecting said ports, plug-rotating means in said casing and separate from and surmounting said plug, a screw-jack threadedly engaging said plug-rotating means and movable axially relative thereto, and camming levers interposed between said plug-rotating means and plug and actuated by said screw-jack means for moving said plug axially relative to said seat, said rotating means acting through said lever means for rotating said plug.

13. A plug valve comprising a casing having spaced ports, a valve seat in said casing between said ports, a plug in said casing and normally seated in said seat, said plug having a passage therethrough for connecting said ports, plug-rotating means in said casing and separate from and surmounting said plug, a screw-jack threadedly engaging said plug-rotating means and movable axially relative thereto, said rotating means and plug having portions overlapping axially and spaced circumferentially by and defining slots directed radially thereof, and camming levers seated in said slots and actuated by said screw-jack means for moving said plug axially relative to said seat, said rotating means acting through said lever means for rotating said plug.

14. A plug valve comprising a casing having spaced ports, a valve seat in said casing between said ports, a plug in said casing and normally seated in said seat, a passage through said plug for connecting said ports, plug-rotating means in said casing and separate from and surmounting said plug, a screw-jack threadedly engaging said plug-rotating means and movable axially relative thereto, said rotating means and plug having portions overlapping axially and spaced circumferentially by and defining slots directed radially thereof, and a camming lever seated in each of said slots and actuated by said screw-jack means, said camming levers being fulcrumed on said rotating means and camming against said plug for unseating said plug.

References Cited in the file of this patent

UNITED STATES PATENTS

| | | |
|---|---|---|
| 2,086,946 | Rick | July 13, 1937 |
| 2,204,440 | Nordstrom | June 11, 1940 |
| 2,376,975 | Morgan | May 29, 1945 |
| 2,408,223 | Nash | Sept. 24, 1946 |
| 2,484,723 | Pain | Oct. 11, 1949 |
| 2,488,932 | Penick | Nov. 22, 1949 |
| 2,504,297 | Bordo | Apr. 18, 1950 |
| 2,612,340 | Laurent | Sept. 30, 1952 |
| 2,663,290 | Walder | Dec. 22, 1953 |
| 2,711,302 | McWhorter | June 21, 1955 |
| 2,744,720 | Wilms | May 8, 1956 |

FOREIGN PATENTS

| | | |
|---|---|---|
| 26,848 | Great Britain | Nov. 12, 1903 |
| 82,269 | Norway | Aug. 17, 1953 |